March 1, 1960
H. H. BEBOW
2,926,477
SELF-PROPELLED FORAGE HARVESTER WITH
COMMON CONVEYING MEANS FOR LOADING
AND UNLOADING THEREOF
Filed Nov. 17, 1958
3 Sheets-Sheet 2
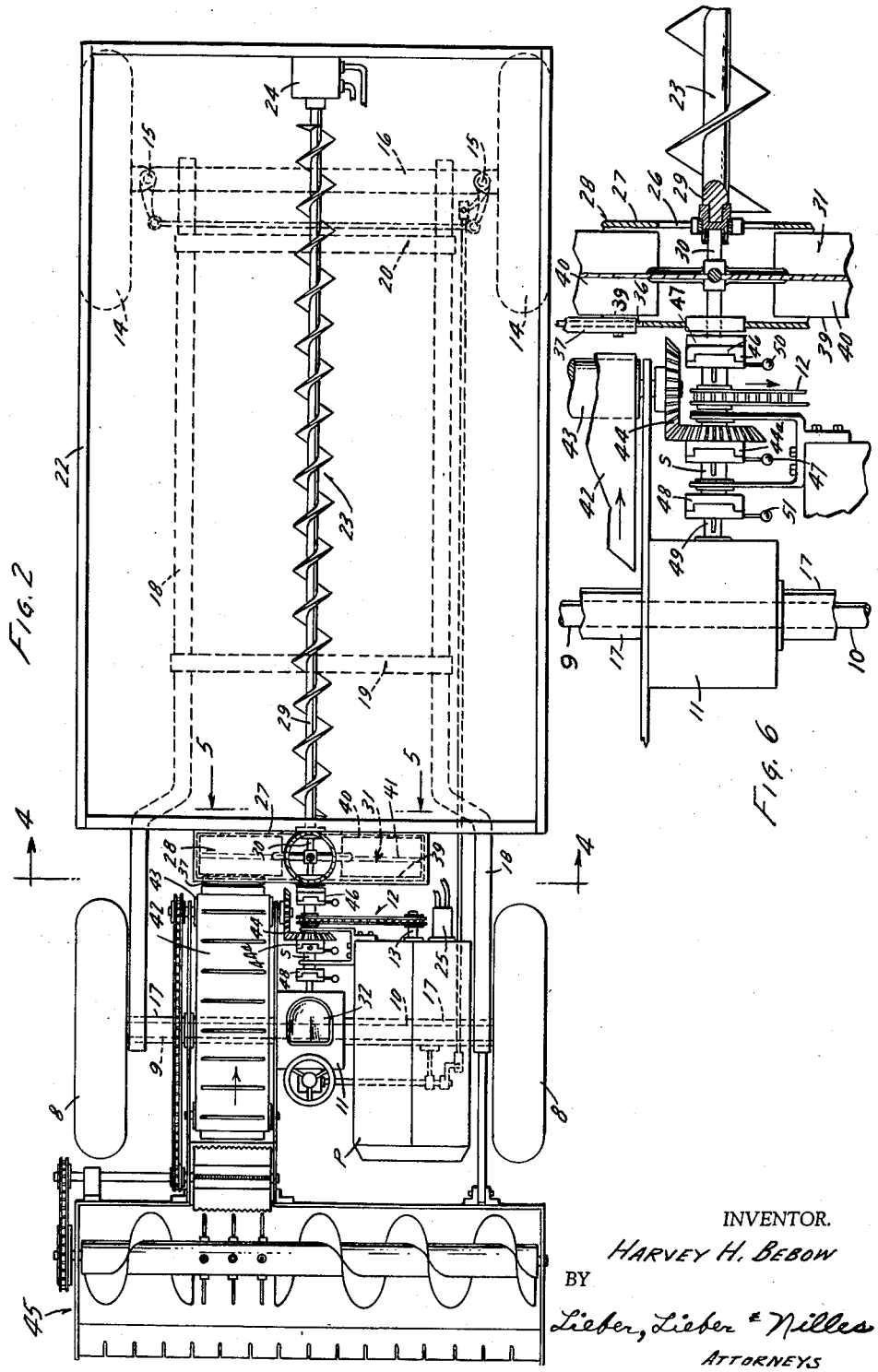
INVENTOR.
HARVEY H. BEBOW
BY
Lieber, Lieber & Nilles
ATTORNEYS March 1, 1960
H. H. BEBOW
2,926,477
SELF-PROPELLED FORAGE HARVESTER WITH
COMMON CONVEYING MEANS FOR LOADING
AND UNLOADING THEREOF
Filed Nov. 17, 1958
3 Sheets-Sheet 3
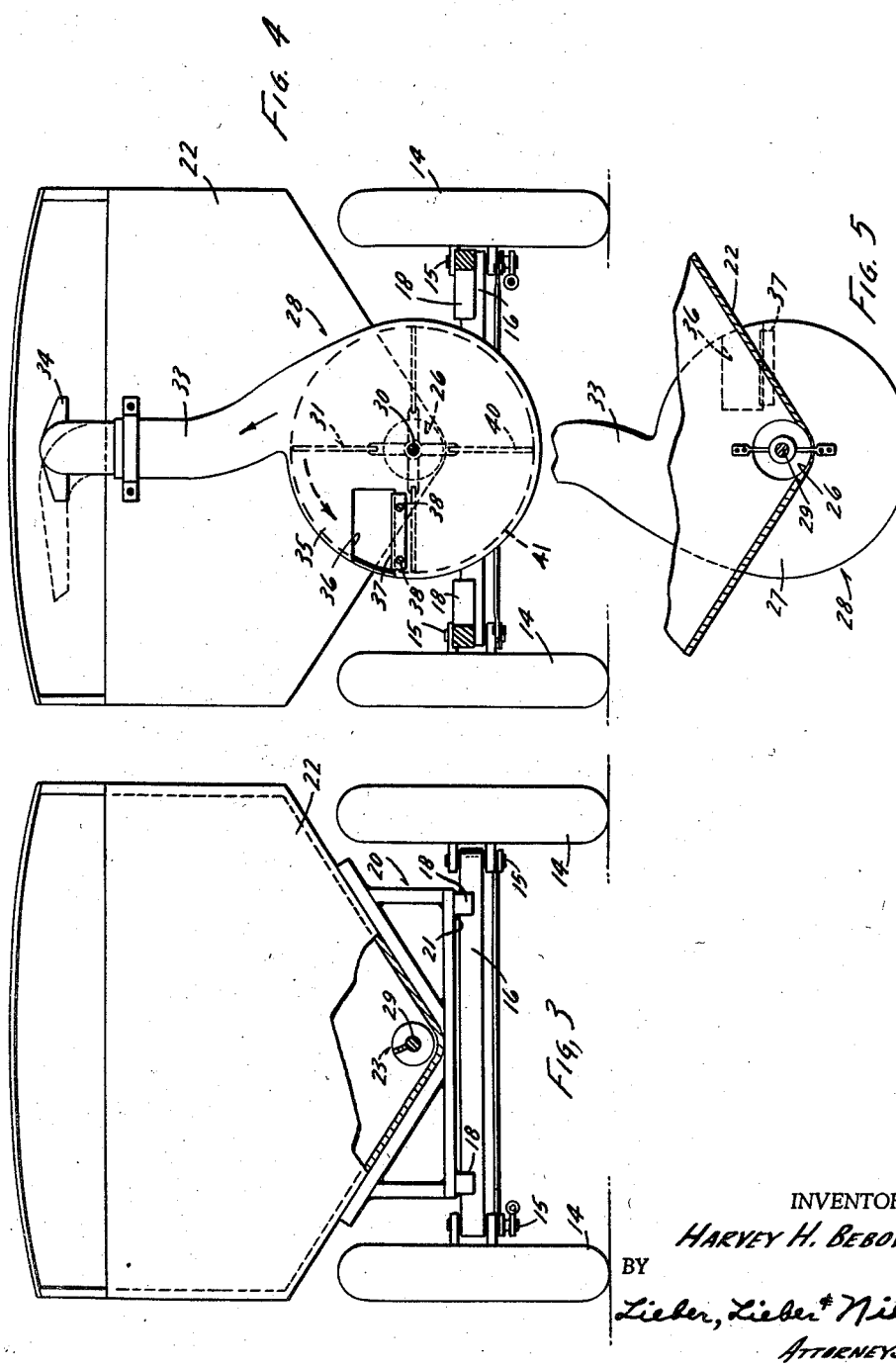
INVENTOR.
HARVEY H. BEBOW
BY
Lieber, Lieber & Nilles
ATTORNEYS

United States Patent Office 2,926,477
Patented Mar. 1, 1960

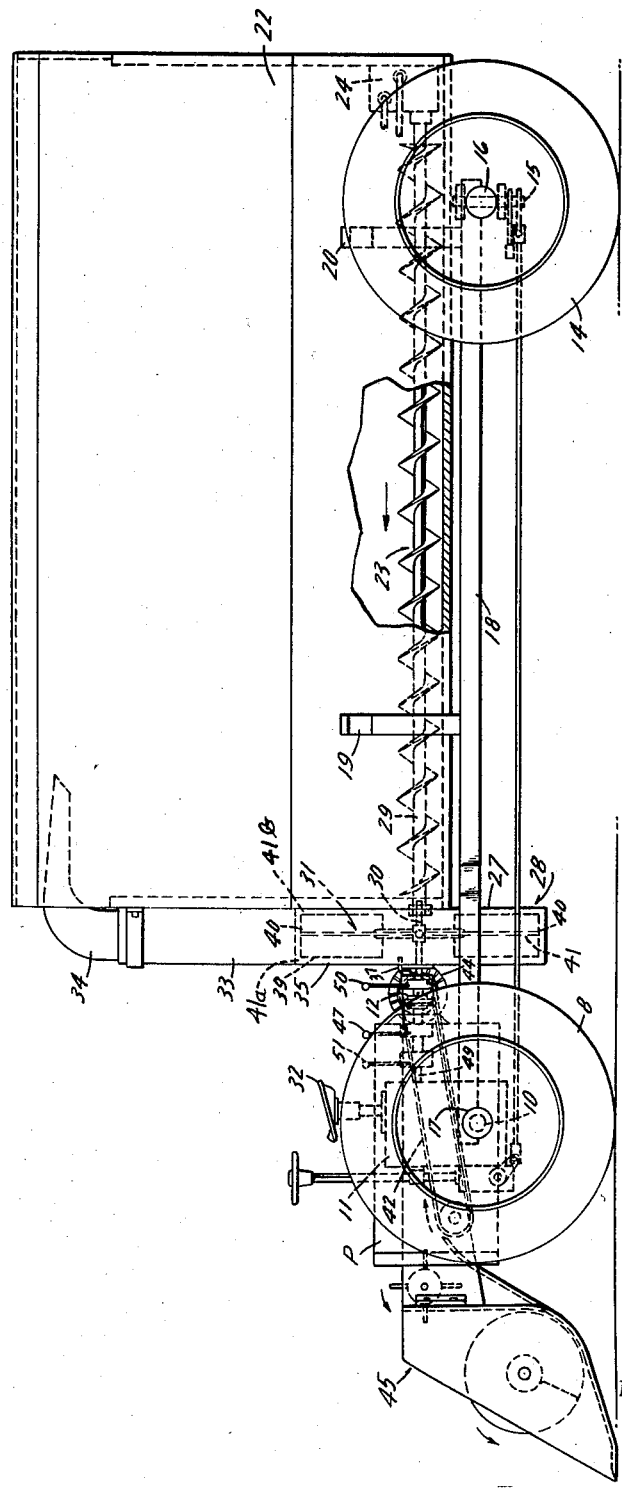
INVENTOR.
HARVEY H. BEBOW
BY
Lieber, Lieber & Nilles
ATTORNEYS

2,926,477

SELF-PROPELLED FORAGE HARVESTER WITH COMMON CONVEYING MEANS FOR LOADING AND UNLOADING THEREOF

Harvey H. Bebow, Fond du Lac, Wis.

Application November 17, 1958, Serial No. 774,244

5 Claims. (Cl. 56—16)

This invention relates to self-propelled forage harvesters of the type which are adapted to travel over the crop, sever and/or pick it up from the ground and convey it to a storage tank carried on the harvester. More particularly, the invention relates to such a harvester having a common unit for chopping the crop, conveying it into the tank, and subsequently conveying the crop from the tank to a silo, feeder or other storage area.

Modern farming practice requires the maximum use of mechanized equipment, with a minimum amount of hired help or labor, in order to make farming economically attractive. The trend of farming operations is toward one-man operations in which a single operator can perform each and all of the phases of any given operation.

Accordingly, the present invention provides an improved self-propeller forage harvester by means of which a single operator can harvest the crop, convey it to another area and there unload it.

More particularly, the invention contemplates a harvester of the above type which has a common chopper-blower unit, which unit cuts the crop and conveys it into the storage tank on the harvester, the unit then subsequently being used to unload the tank into a silo, feeder or the like.

The invention also provides an improved dual feed blower unit of particularly efficient design.

Another more specific object of the present invention is to provide an ensilage harvester of the above type, the conveying unit of which is fed from one side while a second feeding means is inoperative, and subsequently the first feed means rendered inoperative and the second feeding means rendered operative to feed the unit from the other side.

These and other objects and advantages will appear hereinafter, reference being had to the accompanying drawings, in which:

Figure 1 is a side elevational view of a self-propelled harvester made in accordance with the present invention, certain parts being broken away for the sake of clarity in the drawings;

Figure 2 is a plan view of the harvester shown in Figure 1;

Figure 3 is a rear elevational view of the harvester shown in Figures 1 and 2;

Figure 4 is a sectional view taken generally along the line 4—4 in Figure 2, certain parts being broken away for clarity;

Figure 5 is a sectional view taken along line 5—5 of Figure 2; and

Figure 6 is an enlarged fragmentary plan view of the drive connection to certain parts of the harvester.

Referring in greater detail to the drawings, the harvester comprises a pair of front traction wheels 8 mounted on the outer ends of axles 9 and 10 and drivingly connected to a conventional speed change gear transmission and differential unit 11. An endless chain drive 12 connects the output shaft 13 of the conventional power plant P to a drive shaft S (Figure 6) for purposes that will later appear.

The steerable rear wheels 14 are mounted on their spindles 15 carried by the rear transverse member 16. The front axle housings 17 and rear transverse member 16 are connected together adjacent their outer ends by the longitudinal frame members 18 which are welded thereto and thus form a supporting main frame structure.

A front cradle 19 and rear cradle 20 are secured, by welding 21 for example, across the frame members 18 at spaced locations along the length thereof, and are generally V-shaped. A rectangular storage tank 22 is mounted within and supported by these cradles and has a generally V-shaped bottom which complements the cradles. This bottom defines a trough in which the unloading auger 23 is rotatably mounted.

This auger 23 is rotatably driven by a variable speed hydraulic motor 24 which receives its fluid pressure from hydraulic pump 25 that is driven by the power plant in a well-known manner. The auger thus feeds the material from the tank 22 and through the feed opening 26 located centrally in the rear side 27 of the chopper-conveyor unit 28. It will be noted that the auger shaft 29 is rotatably mounted coaxially with the rotor shaft 30 of the rotor 31, and thereby feeds directly into the center of the unit. The hydraulic motor 24 and consequently the auger are operated at selective speeds and independently of the speed of the rotor 31 by the operator from his position on the seat 32.

The chopper-conveyor unit 28 is generally circular as viewed in Figure 4 and has a discharge pipe 33 extending tangentially therefrom. The unit has a directional feed discharging means which takes the form of a curved discharge spout 34 swivelly mounted on the upper end of pipe 33 for directing the chopped material rearwardly into the tank or to one side, as indicated by the broken lines in Figure 4, to a bunk feeder (not shown) or the like. If desired, the spout 34 may be removed from pipe 33 and the latter than connected to a silo-loading pipe (not shown).

The front side 35 of the unit also has a feed opening 36, which opening is generally rectangular in shape as viewed in Figure 4. A shear bar 37 is secured by bolts 38 to the unit adjacent the lower edge of opening 36 and this bar cooperates with the cutting edge 39 of each of the paddles 40 to thereby cut the crop material into relatively short lengths as it is delivered through opening 36 by the upper flight of the endless raddle-type conveyor 42.

The rotor 31 has a generally circular baffle plate 41 secured centrally between the paddles 40 which substantially divides the interior of the unit into a front chamber 41a and rear chamber 41b.

Conveyor 42 is of conventional design and has a rear roller 43 which is rotatably driven by shaft S through the bevel gear set 44. This conveyor acts to carry the material rearwardly from the harvesting table 45 when the clutch 44a between the gear set 44 and shaft S is engaged by lever 47.

The table 45 is adjustable as to height in the known manner and may be of any one of various types, such as for example, that of the general type designed to cut and/or pick up a growing grass crop from the field and shown in the United States Patent No. 2,822,656, issued on February 11, 1958. The table may alternatively be of that general type adapted to cut and gather a row crop, such as shown in United States Patent No. 2,848,103, issued August 19, 1958. Furthermore, these tables may be interchangeable with one another, depending on the type of forage crop to be harvested, but as they form no part of this invention, per se, further description appears to be neither necessary or desirable.

As previously mentioned, the rotor shaft 30 is rotatably mounted in suitable bearings mounted on the sides 27 and 35 of the unit 28 and is connected through a clutch 46 and direction reversing gear unit 47 to the drive shaft S. Another clutch 48 is interposed between the shaft S and gear change transmission input shaft 49. Clutches 46 and 48 are operated through levers 50 and 51, respectively, by the operator from the seat 32.

In operation, as the harvester travels over the ground and the crop is harvested, the hydraulic motor 24 is disengaged which causes the auger 23 to remain stationary. Clutches 44a, 46 and 48 are all engaged and the crop is fed through the front feed opening 36 where it is chopped into short lengths by the action of the paddle cutting edges 39 and the shear bar 37. Upon entering the front chamber 41a, the paddles 40 of the driven rotor 31 forcibly discharge the chopped material through spout 34 and into tank 22.

After the tank has been filled sufficiently, clutches 44a and 46 are disengaged to stop the operation of the table 45 and unit 28, respectively, and the harvester is then driven at a higher speed, as determined by the change speed transmission 11, to the unloading area.

To unload the tank, the clutch 48 is disengaged to thereby stop the transmission 11, and the clutch 46 is engaged to start the blower unit 28. The hydraulic motor 24 is then also engaged by admitting fluid pressure from pump 25 driven by the engine P. The auger is thus rotated to feed the material from the tank through the rear feed opening 26 and into the rear chamber 41b of unit 28 where it is picked up by the rotating paddles 40. The spout 34 has, in the meantime, been turned to the desired position and the material is blown through the spout by the chopper-blower 28 to the desired location.

By means of the present invention, a common chopper-conveyor unit has been provided for a self-propelled forage harvester, which unit is selectively and alternately fed through one side or the other, to thereby either load or unload the storage tank carried by the harvester. The central baffle plate 41 carried by and as part of the rotor, increases the efficiency of the unit by restricting the volume of air entering the particular chamber being used at any one time through that feed opening which is not being used at that time.

This integral one-man harvester, with its common power source and conveyor, not only loads and unloads the harvester but can also be used as a silo or feeder filler, thereby eliminating the need for separate wagon unloaders, silo fillers, or extra wagons and tractive vehicles.

Various modes of carrying out the invention are contemplated as being within the scope of the following claims particularly pointing out and distinctly claiming the subject matter which is regarded as the invention.

I claim:

1. A forage harvester comprising a mobile frame, a container on said frame having an opening in the top thereof and a second opening adjacent the bottom of one end, a power operated chopper-blower on said frame adjacent said second opening, said chopper-blower having an enclosing hood and a discharge conduit, a forage pick up and delivery means on said frame adjacent said chopper-blower, said hood having an opening therein on the side thereof opposite to the said second opening in said container, said delivery means being located adjacent said hood opening, whereby material from said container and said delivery means may be fed to said chopper-blower and expelled through said discharge conduit.

2. A device as set forth in claim 1 including a baffle in said chopper-blower for dividing the interior thereof into two compartments.

3. A device as defined in claim 1 including a conveyor in said container for moving material through said second opening.

4. A device as set forth in claim 1 including material directing means on the discharge conduit whereby material discharged therefrom can be selectively directed into said container or other storage area.

5. A device as recited in claim 1 including driving means for said chopper-blower and conveyor driving means, said conveyor driving means being operated independently of said chopper-blower driving means.

References Cited in the file of this patent

UNITED STATES PATENTS

| | | |
|---|---|---|
| 2,139,417 | Milan | Dec. 6, 1938 |
| 2,630,664 | Hansen | Mar. 10, 1953 |
| 2,641,097 | Mast | June 9, 1953 |
| 2,745,237 | Elliott | May 15, 1956 |